United States Patent [19]
Sullivan

[11] 3,928,599
[45] Dec. 23, 1975

[54] METHOD FOR TREATING RHEUMATOID ARTHRITIS

[76] Inventor: Thomas James Sullivan, 25 Old Gate Road, Thrussington, Leicestershire, England

[22] Filed: Oct. 18, 1974

[21] Appl. No.: 515,919

[30] Foreign Application Priority Data
Oct. 23, 1973    United Kingdom............... 49197/73

[52] U.S. Cl. ............................................... 424/283
[51] Int. Cl.² .......................................... A61K 31/35
[58] Field of Search .................................... 424/283

[56] References Cited
UNITED STATES PATENTS
3,786,071    1/1974    Cairns et al......................... 424/283

*Primary Examiner*—Stanley J. Friedman
*Attorney, Agent, or Firm*—Merriam, Marshall, Shapiro & Klose

[57] ABSTRACT

There is described a method for alleviating the symptoms of rheumatoid arthritis which comprises administering an effective quantity of 6,8-di-t-butyl-4-oxo-4H-1-benzopyran-2-carboxylic acid, or a pharmaceutically acceptable salt thereof, to an animal suffering from rheumatoid arthritis.

7 Claims, No Drawings

METHOD FOR TREATING RHEUMATOID ARTHRITIS

This invention relates to a new method.

According to our invention we provide a method for alleviating the symptoms of rheumatoid arthritis which comprises orally or parenterally administering an effective quantity of 6,8-di-t-butyl-4-oxo-4H-1-benzopyran-2-carboxylic acid, or a pharmaceutically acceptable salt thereof, to an animal suffering from rheumatoid arthritis.

As used herein, the word 'animals' is employed in its biological sense to include lower animals as well as humans unless the contrary is clear from the accompanying subject matter.

The drug, or pharmaceutically acceptable salts thereof, may be prepared according to the method disclosed in U.S. Pat. No. 3,786,071.

Pharmaceutically acceptable salts which may be useful according to the invention include the ammonium, alkali metal (e.g., sodium, potassium and lithium) and alkaline earth metal salts (e.g., calcium or magnesium). Also useful are salts of organic bases, e.g. salts of lower alkylamines such as methylamine or ethylamine, salts of substituted lower alkylamines such as hydroxy substituted alkylamines, or salts of simple monocyclic nitrogen heterocyclic compounds such as piperidine or morpholine. In particular the sodium salt, or more preferably the free acid, may be used.

The 6,8-di-t-butyl-4-oxo-4H-1-benzopyran-2-carboxylic acid, or the pharmaceutically acceptable salt thereof, may be administered on its own or in admixture with a suitable diluent or carrier. We prefer to use capsules containing the pure drug, but fillers (e.g., lactose) and flow aids or glidants (e.g., magnesium stearate, talc etc) may also be included in the composition.

Suitable dosages of the compound in treatment of humans are from about 200 to 2,000 mg, preferably 600 to 1,200 mg per day, which may be administered in divided doses from 1 to 6 times a day or in sustained release form. Thus unit dosage forms comprise from about 20 to 500 mg of the compound.

The compound is preferably administered orally. It is also preferred to use the compound in finely divided form. In particular it is preferred to administer from 200 to 300 mg of the compound orally three times daily.

The compound may be administered over a period of from about 1 to about 365 days.

The compound is active in the carrageenin induced oedema test (See Example A below) when administered orally at a dose of 100 to 200 mg/kg per day, and when administered intraperitoneally at a dose of 10 to 30 mg/kg per day. At these dosages there are no signs of toxicity. The mean ± SEM% inhibition produced by 200 mg/kg per day orally was 21.1 ± 4.4 (6 experiments). The mean ± SEM% inhibition produced by 30 mg/kg per day intraperitoneally was 39.1 ± 2.4 (27 experiments). The intraperitoneal $ED_{50}$ for the compound was 41 mg/kg. These results were obtained by dosing the rats one hour before carrageenin injection and measuring the effect 4 hours after the carrageenin injection.

The compound is also active against adjuvant arthritis in the rat (See Example B below) when administered orally at a dosage of from 100–200 mg/kg per day from the day before to 16 days after the initiation of the arthritis. 100 mg/kg given orally once daily from day −1 to 16 (6 days a week) produced a mean ± SEM% inhibition of 37.1 ± 2.4 (16 experiments).

The compound is also active orally as an analgesic in the acetic acid induced mouse writhing test (See Example C), the yeast inflamed rat paw pressure test (See Example D) and the mouse hot plate test (See Example E). In the method of Example C the compound (as the sodium salt) had an $ED_{50}$ of 48.0 mg/kg and is some 7 to 8 times more potent than asprin. In the method of Example D the compound (as the sodium salt) had an $ED_{50}$ in the inflamed paw of 648.5 mg/kg which is slightly lower than that for oral asprin. Both compounds were inactive in the non-inflamed paw. In the method of Example E the compound gave dose related increases in reaction time of up to 43% at 800 mg/kg; orally administered asprin was inactive in this test at doses up to 800 mg/kg.

The tests mentioned above and detailed below are predictive of the usefulness of the compound in the treatment of rheumatoid arthritis and symptoms such as swelling, pain and tenderness of joints.

EXAMPLE A

Groups of ten male or female Ash/F rats (Fisons Limited) in the weight range 104–230g were used. These were kept for at least a week before use in controlled environment rooms, and were fed on a standard rat diet. The rats were starved overnight before and also during the test, but water was available at all times.

Drugs were dissolved or suspended in distilled water alone or in 0.05% Dispersol in distilled water. Drugs were administered either orally, using a long metal needle, in a volume of 1 ml/100g body weight or intraperitoneally in a volume of 0.5 ml/100g body weight. Control animals received a similar volume of drug vehicle.

0.1 ml of 1% solution of carrageenin sulphate in N saline, sterilised by autoclaving, was injected into the footpad of one hindfoot to produce the oedema. Drugs were administered before injection of carrageenin and their effect measured 4 hours after carrageenin.

The swelling of the hindfoot was measured by immersing the foot in a mercury plethysmograph (Van Arman, Begany, Miller and Pless, (1965) *J Pharmac*, 150, 328–334) up to an ink mark on the skin overlying the ankle joint. Foot volumes were measured immediately after injection of carrageenin and 4 hours thereafter. The increases in foot size in the drug-treated and control animals were compared using Student's t-test, and the difference considered significant if $P \leq 0.05$. The % inhibition produced by the drug was also calculated, using the following formula:

$$\% \text{ Inhibition} = \text{Mean increase in foot size} \left(\frac{\text{control-test}}{\text{control}}\right) \times 100$$

Doses of the compound were calculated as the sodium salt (93.9% active form).

EXAMPLE B

Groups of 5 to 10 male or female Ash/F (Fisons Limited), Ash Wistar (Ash Laboratories) and Lewis (Microbiological Associates, USA) rats in the weight range 101–270g were used in the experiments. These were kept for at least a week before use in controlled environment rooms, and had food and water ad libitum. FCA (Freunds Complete Adjuvant, page 303 'Immunology for Students of Medicine' by Humphrey and White 3rd Edn Blackwell) was freshly prepared for each experiment, and was made by grinding up dead *Mycobacterium tuberculosis* in liquid paraffin to a final concentration of 5 mg/ml. Each rat was injected on day 0 with 0.05 ml FCA into the footpad of one hindfoot.

Drugs were dissolved or suspended in either distilled water, 0.05% Dispersol (*Brit J Pharmacol* 1963 Vol 8 p 231) or 0.05% Polysorbate 80, which is polyoxyethylene (20) sorbitan mono-deate, (both prepared in distilled water). Drugs were administered either orally, using a long metal needle, in a volume of 1 ml/100g body weight, or intraperitoneally in a volume of 0.5 ml/100g body weight. Arthritic controls, which were injected with FCA, and normal rats which did not receive FCA, received similar volumes of the drug vehicle.

Anti-inflammatory activity was assessed on the swelling of the injected hindfoot, which was measured by immersing the hindfoot in a mercury plethysmograph (Van Arman, et al. See Example A) up to an ink mark made on the skin overlying the ankle joint. The initial volume of the foot was subtracted from its final volume. The results were considered significant when $P \geqslant 0.05$.

The % inhibition produced by the drug was calculated as follows:

% Inhibition = Mean increase in foot size $$\left(\frac{\text{control-test}}{\text{control}}\right) \times 100$$

All foot measurements were made 20-24 hours after a dose of drug. Doses of the compound were calculated as the sodium salt (93.9% active form).

EXAMPLE C

Groups of 6 or 12 LACA/OLAC mice in the weight range 20-30g are used. The mice on arrival are housed in a controlled environment room and are kept in this area for one week before testing. The test itself is performed in an adjoining room under the same conditions of light, noise, temperature and relative humidity. Mice are divided into groups of six and drug treatments are allocated randomly throughout. Two operators each using one group of six mice administer drugs orally thirty minutes prior to injection of acetic acid. Drugs are finely ground with a mortar and pestle and suspended in 1% methyl cellulose solution or 0.05% Dispersol solution. The acetic acid solution is prepared by making up 0.5 ml glacial acetic acid to 100 ml with distilled water in a volumetric flask. The freshly made solution is then maintained at 37°C in a water bath prior to injection. Drugs are administered orally in a dose volume of 1 ml/100g body weight. Thirty minutes after administration of drugs, mice are injected intraperitoneally with 0.4 ml of 0.5% acetic acid. The mice are immediately placed into separate compartments of a perspex box and the number of writhes in the following 20 minutes is noted. Analgesic activity is calculated as the percentage decrease in the mean number of writhes of a treated group compared with the control group. $ED_{50}$'s are calculated by the methods of Litchfield and Wilcoxon, (1949) *J Pharmacol Expet Ther* 96 99-113.

EXAMPLE D

Groups of 10 male or female Ash/CSE rats in the weight range 70-110g are used. The rats on arrival are housed in a controlled environment room and are kept in this area for one week before testing. The test itself is performed in an adjoining room under the same conditions of light, noise, temperature and relative humidity. 0.1 ml of a 5 or 10% suspensions of Brewer's Yeast in saline is injected into the plantar region of the right hind feet of a number of rats which is slightly in excess of that required for the experiment. This is necessary since some rats are always rejected at a later stage. One hour later the pain threshold in both feet is measured using the 'Analgesymeter' (Ugo Basile). This device allows the operator to apply a constantly increasing force to the rat paw via a Teflon coated peg. This is achieved by a preselected weight moving with constant speed along an arm such that the further it proceeds along the arm the greater the force exerted on the peg. The operator controls the movement of the weight by means of a foot pedal, and a scale and pointer are provided to give a reading in grams. The end point is taken when the rat struggles, that is an escape response. When this occurs, the operator stops the weight, removes the rat and notes the pain threshold in grams. Animals with pain threshold in values lower than 30g or greater than 400g are rejected, as are rats in which the pain threshold for the injected foot is greater than that obtained from the contralateral non-injected foot. The point of contact between the peg of the Analgesymeter and the foot of the rat is carefully marked so that subsequent pain threshold measurements can be made in exactly the same place. One hour after measurement of pain thresholds, i.e. 2 hours after the injection of yeast, drugs are admininstered. The drug treatments which are allocated randomly are given orally in a dose volume of 1 ml/100g body weight and are prepared by grinding with a mortar and pestle followed by suspension in a 1% solution of methyl cellulose in distilled water. One hour later, i.e. 3 hours after injection of yeast, the pain threshold from the 2 to the 3 hour reading is calculated for both feet.

The $ED_{50}$ values for the compound under test and aspirin were calculated by the method of least squares using responses from several experiments and calculating the linear regression of the data. From this $ED_{50}$ values and 95% confidence limits were obtained.

EXAMPLE E

The test is performed essentially as described by Eddy and Leimbach, (1953) *J Pharmacol Expec Ther*, 107 385-393 and modified by Harris and Pierson (1964) *J Pharmacol Expec Ther*, 143 141-164 with the exception that experimental readings are arbitrarily terminated at 90 minutes.

Groups of 10 male LACA/OLAC or LACA/F mice in the weight range 20-30g are used. The mice on arrival are housed in a controlled environment room and are kept in this area for one week before testing. The test itself is performed in an adjoining room under the same conditions of light, noise, temperature and relative humidity. The reaction time to the noxious stimulus for each mouse is determined by placing the mouse on the hot plate. This is made of copper and contains a constant boiling mixture comprising equal parts of acetone and ethyl formate. This mixture boils at 55.5°–56°C and is kept under constant reflux. Mice are restrained on the hot plate in an open perspex cylinder and the time taken for each mouse to respond to the heat is recorded using a stopwatch. The mouse responds by lifting and licking a hind foot. A 30 second cut off time is used and if an animal does not respond before 30 seconds have elapsed it is removed from the hot plate and this is considered a complete or 100% effect. Further, mice with a preliminary reaction time greater than 20 seconds are excluded from the test group. Mice are starved throughout the experiment and for the previous 24 hours although water is allowed ad libitum. Two control reaction times 15 minutes apart are taken in each animal after which the animals are dosed orally with test or control solutions in a dose volume of 1 ml/100g body weight. Drug treatments are allocated in a random fashion and are prepared by grinding with a mortar and pestle and suspending in a 1% solution of methyl cellulose in distilled water. Control mice receive 1% methyl cellulose solution in the same dose volume. Measurements of reaction times are taken 15, 30, 60 and 90 minutes after dosing. Average control and experimental response times for each group are plotted against time in minutes after dosing. A percentage analgesia for each group is calculated by dividing the area under the experimental curve by the area which would be formed if all the animals went to the cut off time at all intervals (100% effect). All areas are measured using a planimeter. Dose response curves are plotted and $ED_{50}$ values obtained using the method of Litchfield and Wilcoxon (1949) *J Pharmacol Expec Ther*, 96 99–113.

I claim:

1. A method for alleviating the symptoms of rheumatoid arthritis in an animal which comprises administering an effective quantity of 6,8-di-t-butyl-4-oxo-4H-1-benzopyran-2-carboxylic acid, or a pharmaceutically acceptable salt thereof, to an animal suffering from rheumatoid arthritis.

2. A method according to claim 1, wherein the sodium salt or the free acid is administered.

3. A method according to claim 1, wherein from 200 to 2,000 mg of 6,8-di-t-butyl-4-oxo-4H-1-benzopyran-2-carboxylic acid, or a pharmaceutically acceptable salt thereof, is administered per day.

4. A method according to claim 3, wherein from 600 to 1,200 mg of 6,8-di-t-butyl-4-oxo-4H-1-benzopyran-2-carboxylic acid, or a pharmaceutically acceptable salt thereof, is administered per day.

5. A method according to claim 1, wherein 6,8-di-t-butyl-4-oxo-4H-1-benzopyran-2-carboxylic acid, or a pharmaceutically acceptable salt thereof, is administered orally.

6. A method according to claim 1, which comprises administering from 200 to 300 mg of 6,8-di-t-butyl-4-oxo-4H-1-benzopyran-2-carboxylic acid, or a pharmaceutically acceptable salt thereof, orally three times a day.

7. A method according to claim 1, which comprises administering an effective quantity of 6,8-di-t-butyl-4-oxo-4H-1-benzopyran-2-carboxylic acid, or a pharmaceutically acceptable salt thereof, to a human.

* * * * *